US006858981B2

(12) United States Patent
Cho et al.

(10) Patent No.: US 6,858,981 B2
(45) Date of Patent: Feb. 22, 2005

(54) ELECTRON EMISSION SOURCE COMPOSITION FOR FIELD EMISSION DISPLAY DEVICE AND FIELD EMISSION DISPLAY DEVICE FABRICATED USING SAME

(75) Inventors: Sung-Hee Cho, Seoul (KR); Min-Jae Yoon, Suwon (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 10/421,407

(22) Filed: Apr. 22, 2003

(65) Prior Publication Data

US 2004/0066132 A1 Apr. 8, 2004

(30) Foreign Application Priority Data

Apr. 22, 2002 (KR) .................................. 10-2002-0021963

(51) Int. Cl.[7] .................................................... H01J 1/62
(52) U.S. Cl. ........................................ 313/495; 313/309
(58) Field of Search .................................... 313/309, 310, 313/311, 495

(56) References Cited

U.S. PATENT DOCUMENTS 5,194,780 A  3/1993  Meyer

FOREIGN PATENT DOCUMENTS

JP  2000-123712  4/2000

OTHER PUBLICATIONS

Patent Abstract of Japan, Publication No. 2000–123712, Published on Apr. 28, 2000, in the name of Baba Kazuhiro, et al.

*Primary Examiner*—Vip Patel
(74) *Attorney, Agent, or Firm*—Christie, Parker & Hale, LLP

(57) ABSTRACT

Disclosed is an electron emission source composition for a field emission display device including 1 to 20% by weight of carbon nano tubes; glass frit; an organic binder resin comprising ethyl cellulose and acrylate resin and/or acryl resin; and an organic solvent, wherein the glass frit is present in an amount of 1 to 500 parts by weight with respect to 100 parts by weight of the carbon nano tubes.

22 Claims, 12 Drawing Sheets

ELECTRON EMISSION SOURCE COMPOSITION FOR FIELD EMISSION DISPLAY DEVICE AND FIELD EMISSION DISPLAY DEVICE FABRICATED USING SAME

CROSS REFERENCE TO RELATED APPLICATION

This application claims priority of Korean Application No. 2002-21963 filed in the Korean Intellectual Property Office on Apr. 22, 2002, the disclosure of which is incorporated hereinto by reference.

FIELD OF THE INVENTION

The present invention relates to an electron emission source composition for a field emission display device and a field emission display device fabricated using the same, and more particularly, to an electron emission source composition for a field emission display device capable of micro-patterning a cathode electrode and improving emission current characteristics of an electron emission source by minimizing current density and vacuum degree declines, and a field emission display device capable of emitting electrons and acting as a resistive layer at the same time.

BACKGROUND

A field emission display device (hereinafter referred to as "FED") is a representative display device for displaying an image by applying a strong field on an emitter which is an electron emission source to provide the electrons with a tunneling effect, moving the emitted electrons through vacuum, and colliding the electrons with a phosphor screen formed with an anode electrode to emit the light and express the image.

Carbon nano tubes (CNT) have recently emerged as a potentially useful electron emission source. In particular, carbon nano tubes are anticipated to be an ideal electron emission source since they feature a low work function, the resultant electron emission source can be driven by applying low voltages, and the method of fabricating the same is not complicated. They will thereby offer advantages to realize a large size panel display.

Generally, a field emission display device having carbon nano tubes as the electron emission source constitutes a triode structure in order to control electron emission. The electron emission layer of carbon nano tubes is formed by either a thin film coating process using vacuum evaporation, or a thick film coating process using a printing composition. The latter process includes the steps of preparing a composition consisting essentially the carbon nano tubes and printing the composition on a cathode electrode to provide the electron emission layer. The thick film coating process therefore is advantageous in that it involves a simple manufacturing process that is suitable for mass production relative to that of the thin film coating process.

The carbon nano tube electron emission source is formed by preparing a composition comprising carbon nano tubes, a binder, and a solvent; screen-printing the obtained composition on the electrode; and baking it at a high temperature of 400° C. or more under an air atmosphere.

The binder may include any thermal decomposing resin such as acrylate, acryl, or ethyl cellulose (EC). If only acrylate resin is employed as the thermal decomposing resin, the carbon nano tube composition is advantageously well patterned, but the current density disadvantageously is decreased to a value such as 20 $\mu A/cm^2$ at 7.5 $V/\mu m$ upon application to a triode carbon electron emission source.

On the other hand, if acryl or ethyl cellulose is employed, the current density is advantageously increased to 100 $\mu A/cm^2$ or more, but it disadvantageously shrinks by the thermal decomposition after the baking process, and the attachment strength is weakened between the pattern and the substrate. Further, the composition is inevitably contacted with a photoresist after exposing with an ultraviolet ray during the patterning process. Disadvantageously, the reaction between the composition and the photoresist causes a short circuit between a gate electrode and a cathode electrode. When the composition is employed for the triode carbon electron emission source, it causes a problem in that the working voltage may be increased since the obtained film is too thick and the distance to the gate is too far.

As a result, any one resin selected from the group consisting of acrylate resin, acryl resin, and ethyl cellulose is employed for fabricating the triode carbon nano tube, and it is difficult to satisfy both the patterning characteristic and the current density at the same time.

In addition, a structure has been proposed with a resistive layer between a cathode electrode and an emitter in order to improve the uniformity of electron emission (U.S. Pat. No. 5,194,780). However, this method requires additional coating and patterning processes for providing the resistive layer, rendering the manufacturing process more complicated and decreasing the yield.

SUMMARY OF THE INVENTION

In one embodiment, the invention is directed to an electron emission source composition comprising 1 to 20% by weight of carbon nano tubes, glass frit, an organic binder resin comprising ethyl cellulose and acrylate resin and/or acryl resin, and an organic solvent, wherein the glass frit is present in an amount of 1 to 500 parts by weight per 100 parts by weight of the carbon nano tubes.

The present invention further provides a field emission display device comprising a first substrate and a second substrate opposite the first substrate with a predetermined space to construct a vacuum container therebetween; an electron emission source positioned on either the first or the second substrate; means for emitting electrons from the electron emission source; and means for emitting light positioned on the other of the first or second substrate to express an image by means of the electrons emitted from the electron emission source, wherein the electron emission source comprises 1 to 30% by weight of carbon nano tubes and has a specific resistance of 1 to $10^7$ $\Omega cm$.

The patent or application file contains at least one drawing executed in color. Copies of this patent or patent application publication with color drawing(s) will be provided by the Office upon request and payment of the necessary fee.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENTS

Figure 1:
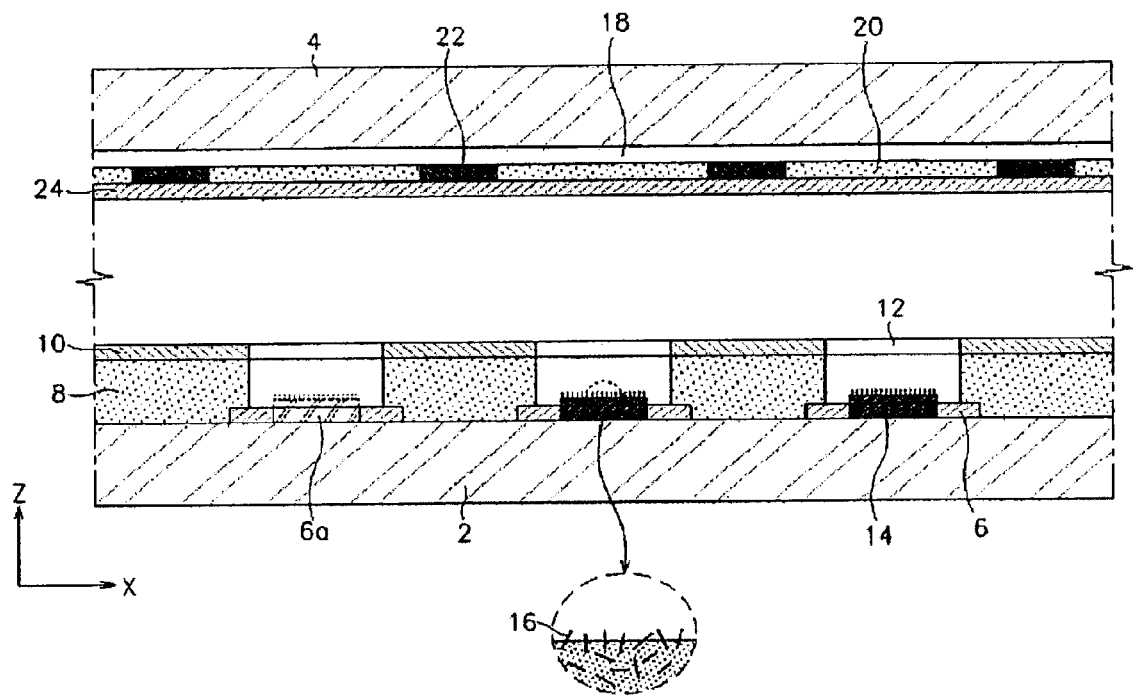
FIG. 1 is a partial cross-sectional view showing a field emission display device according to Example 1 of the present invention.

The present invention relates to an electron emission source composition for a field emission display comprising 1 to 20% by weight of carbon nano tubes, glass frit, an organic binder resin, and an organic solvent. The organic binder resin includes ethyl cellulose and acrylate resin and/or acryl resin.

Further, the glass frit is present in an amount of 1 to 500 parts by weight per 100 parts by weight of the carbon nano tubes.

When the carbon nano tubes includes less than 1% by weight, the emission current density of the field emission device may decrease, and when it is more than 20% by weight, the thickness of the obtained thick layer may be undesirable since the intensity of the ultraviolet ray transmitted though the thick layer decreases when the composition is printed onto the thick layer and exposed by the ultraviolet ray. Also, when the amount of carbon nano tubes ranges from 1 to 20% by weight, the resultant electron emission source has a specific resistance of 1 to $10^7$ Ωcm, and when the amount of carbon nano tubes falls outside of the range, the electron emission source cannot emit electrons and function as a resistive layer at the same time.

The amount of glass frit is preferably 1 to 500 parts by weight per 100 parts by weight of carbon nano tubes. If the amount of glass frit is less than 1 part by weight, the current density of the field emission device may decrease, and when it is more than 500 parts by weight, the viscosity of the composition is too high to be printed properly and the emission current density may be reduced.

The organic binder resin includes ethyl cellulose and acrylate and/or acryl resin. More preferably, all of acrylate resin, acryl resin, and ethyl cellulose are employed.

The acrylate resin may include, for example, epoxy acrylate or polyester acrylate, and it preferably includes a cresol epoxy acrylate oligomer or metamethylacrylate (MMA). Also, the acryl resin may include an acryl copolymer. The organic binder resin is preferably present in an amount of 40 to 80% by weight.

According to the present invention, the electron emission source composition includes the organic binder resin in which 2 or more kinds of resins are mixed, so that it can prevent a short between the gate electrode and the cathode electrode. When the organic binder resin falls outside of the range, the emitted current density is undesirably decreased.

The weight ratio of the acrylate resin or the acryl resin to the ethyl cellulose is preferably 1:1 to 1:2, and the weight ratio of acrylate resin to acryl resin to ethyl cellulose is preferably 1:1:1 to 0.5:1:1.

Further, the electron emission source composition according to the present invention may include an organic solvent. The organic solvent is used to control the viscosity of the composition of the present invention, and it preferably includes, for example, terpineol, butyl carbitol acetate, toluene, or texanol. The amount of organic solvent is preferably 1 to 20% by weight. When the amount is more than 20% by weight, the reactivity between a photoinitiator and a monomer is weakened so that the exposure processability deteriorates.

The electron emission source composition may further include a photoinitiator, a photoreactive monomer, an antifoamer, a dispersant, and the like. The photoinitiator may be used in the form of a mixture of a thermal decomposable acrylate-based monomer, a benzophenon-based monomer, an acetophenone-based monomer, a thioxanthene-based monomer or the like with a solvent, and it preferably includes epoxy acrylate, polyester acrylate, 2,4-diethyloxanthone, or 2,2-dimethoxy-2-phenyl acetophenone. The solvent is preferably terpineol, butyl carbitol acetate (BCA), toluene, or texanol.

The amount of the photoinitiator is preferably 0.1 to 20% by weight based on the total weight of the electron emission source composition. When the amount of the photoinitiator is less than 0.1% by weight, it is difficult to initiate the reaction during the exposure, and when it is more than 20% by weight, it causes a problem in that it suddenly initiates the photoreaction so that the thickness of the obtained thick film may decrease.

The photoreactive monomer is added as an enhancer for decomposing a pattern, and it includes a thermal decomposable acrylate-based monomer, a benzophenon-based monomer, an acetophenone-based monomer, and/or a thioxanthene-based monomer, and it preferably includes epoxy acrylate, polyester acrylate, 2,4-diethyloxanthone, and/or 2,2-dimethoxy-2-phenyl acetophenone. The photoinitiating monomer may be used in an amount up to 10 parts by weight per 100 parts by weight of the electron emission source.

The amounts of the dispersant and the antifoamer are each preferably no less than 0 parts by weight and no more than 10 parts by weight per 100 parts by weight of the electron emission source. The dispersant may include any conventional surfactants such as Foamex 810 or BYK-164 (manufactured by "Tego"). The antifoamer may also include any conventional agent capable of removing foams, for example, silicone-based materials.

Hereinafter, the method of preparing the electron emission source composition according to the present invention will be described.

A carbon nano tube powder is mixed with glass frit. At this time, 1 to 500 parts by weight of the glass frit are preferably used per 100 parts by weight of the carbon nano tube powder. The mixing process can be performed by rotating the components at a rate of 5 to 100 rpm for 1 to 24 hours using a ball mill.

An organic binder resin is then mixed with the obtained mixture of carbon nano tube powder and glass frit.

As the organic binder resin, a mixture of ethyl cellulose with acrylate resin and/or acryl resin is used. The organic binder resin mixture is prepared by further mixing acrylate resin and/or acryl resin and ethyl cellulose with the organic solvent. A dispersant is then added to the resin mixture.

The weight ratio of acrylate resin or acryl resin to ethyl cellulose is preferably 1:1 to 2:1. More preferably, acrylate resin, acryl resin, and ethyl cellulose are mixed in a weight ratio of 1:1:1 to 0.5:1:1.

The organic solvent is preferably terpineol, butyl carbitol acetate (BCA), toluene, or texanol.

Suitable dispersants include Foamex 810 and BYK-164 (manufactured by "Tego"). The dispersant may be used in an amount of 0 to 10 parts by weight per 100 parts by weight of the electron emission source composition.

The weight ratio of carbon nano tubes to the resin mixture is preferably 1:0.1 to 50. To the obtained mixture, 0.1 to 20% by weight of a photoinitiator can be added, and it is then agitated for 1 to 10 hours. The antifoamer can be further added, at 0 to 10 parts by weight per 100 parts by weight of the electron emission source composition.

The amount of photoreactive monomer is preferably up to 10 parts by weight per 100 parts by weight of the total electron emission source composition, and it acts as an enhancer for decomposing the pattern. When the photoreactive monomer is present in an amount greater than 10 parts by weight, it is not preferable since the composition may be dried.

The organic solvent is then added to provide an electron emission source composition having a viscosity of 10,000 cP to 50,000 cP. The amount of organic solvent is preferably 1 to 20% by weight. When the amount of organic solvent is more than 20% by weight, the reactivity between the photoinitiator and the monomer is weakened so that exposure processability deteriorates.

Hereinafter, the method of fabricating the electron emission source for the field emission display device is described.

The electron emission source composition obtained by the above method is printed on a cathode electrode to form a thick layer, and dried at a temperature of 90 to 110° C. for 10 minutes to 1 hour.

Subsequently, the thick layer is exposed using a mask. At this time, the exposing energy is preferably 100 to 20,000 mJ/cm$^2$, and it is adjusted based upon the desired thickness of the layer. The exposed layer is developed in a mixed solution of 0.4 to 5% sodium carbonate aqueous solution and acetone, or ethanol, and the residual is removed using an ultrasonic cleaner.

The developed layer is baked at a temperature of 400 to 500° C. for 10 to 30 minutes to provide an electron emission source. When the baking temperature is less than 400° C., it is not preferable since the organic components would not be removed and the glass frit would not melt, and when it is more than 500° C., it is not preferable since the carbon nano tubes react with oxygen and are lost.

In the resulting electron emission source, the carbon nano tubes are present in an amount of 1 to 30 wt %, and preferably 20 to 30 wt %, based on the total weight of the electron emission source because the evaporable materials (e.g. solvent) evaporate and are thereby removed according to the above-described process. In addition, the electron emission source obtained from the previous process has a specific resistance of 1 to $10^7$ Ωcm, so that it can function as both the electron emission source and the resistive layer.

A field emission display device having the electron emission source obtained form the previous process includes a first substrate and a second substrate opposite to the first substrate, leaving a certain space therebetween to construct a vacuum container; an electron emission source positioned on either the first or second substrate; means for emitting the electrons from the electron emission source; and means for emitting light positioned on the other substrate to express an image by the electrons emitted from the electron emission source, wherein the electron emission source includes carbon-based electron emission materials and resistive conductive materials having a specific resistance of 1 to $10^7$ Ωcm so that it can both emit electrons and function as a resistive layer.

A suitable means for emitting the electrons includes cathode electrodes formed in a stripe pattern on the substrate to be provided with the electron emission source, and having an emitter receptor in which a conductive material is removed so that the electron emission source is accommodated in the emitter receptor; an insulating layer formed on the whole surface of the substrate to cover the cathode electrodes excluding the electron emission source; and gate electrodes formed on the insulating layer in a stripe pattern perpendicular to the cathode electrodes and having a through hole to expose the electron emission source.

In an alternative embodiment, the cathode electrodes are formed in a stripe pattern without the emitter receptor, and the electron emission source is positioned on the surface of the cathode electrodes.

In another alternative embodiment, the means for emitting the electrons includes: gate electrodes formed in a stripe pattern on one substrate to be provided with the electron emission source; an insulating layer formed on the whole surface of the substrate to cover the gate electrodes; and cathode electrodes formed on the insulating layer in a stripe pattern perpendicular to each of the gate electrodes and having an emitter receptor in which the conductive material is removed on its edge so that the electron emission source is accommodated in the emitter receptor.

The means for emitting the electrons may further include a counter-electrode disposed between the cathode electrodes with a certain distance therebetween. The counter electrode contacts the gate electrode through a via hole formed in the insulating layer to electrically link it to the gate electrode.

Preferably, the edge of the electron emission source is positioned inward of the edge of the cathode electrode toward the inside of the cathode electrode to induce the focused effects by the cathode electrode.

Hereinafter, this invention will be described in further detail by way of examples with reference to the accompanying drawings.

FIG. 1 is a partial cross-sectional view showing a field emission display device according to one embodiment of the present invention. As shown in FIG. 1, the field emission display device is constructed with a first substrate (hereinafter referred to as 'back substrate') and a second substrate (hereinafter referred to as 'front substrate') to provide an inner space. The back substrate 2 is provided with a means for emitting electrons upon applying the field. The front substrate 4 is provided with a means for expressing a certain image by the emitted electrons.

More particularly, a cathode electrode 6 having an emitter receptor 6a is formed on the back substrate 2 in a stripe pattern in one direction. Over the cathode electrode 6, an insulating layer 8 covers the whole surface of the back substrate 2. Also, on the insulating layer 8, a gate electrode 10 is formed in a stripe pattern in a direction perpendicular to that of the cathode electrode 6.

If the pixel area is defined as an intersection area of the cathode electrode 6 and the gate electrode 10, a through hole 12 penetrating the gate electrode 10 and the insulating layer 8 is formed on the pixel area so that the cathode electrode 6 is exposed. In each pixel area where the cathode electrode 6 is exposed by the through hole 12, an emitter receptor 6a is formed where conductive materials of the cathode electrode 6 are removed. An electron emission source 14 is accommodated in the emitter receptor 6a.

The electron emission source 14 is composed of carbon nano tubes and resistive conductive materials having a specific resistance of $1 \sim 10^7$ $\Omega$cm so that it can emit electrons due to the electron emission materials, and at the same time it can function as a resistive layer due to the aforementioned specific resistance.

Since a number of carbon nano tubes 16 are exposed on the surface of the electron emission source 14, each of the exposed carbon nano tubes 16 acts as a field emission emitter and emits electrons during the following driving process. It can be considered that a carbon nano tube 16 in the electron emission source 14 corresponds to a single conventional microtip emitter.

The electron emission source 14 is linked to the cathode electrode 6 in the horizontal direction by contacting the side of the cathode electrode 6. The electron emission source 14 thereby functions as the resistive layer to link the cathode electrode 6 and each carbon nano tube 16.

In addition, R, G, and B phosphor layers 20 are disposed in a transparent anode electrode 18 while leaving a certain space in the direction of the cathode electrode 6. A black matrix layer 22 is disposed between R, G, and B phosphor layers 20 to improve the contrast ratio.

Optionally, a thin metal layer 24 composed of a metal such as aluminum may be positioned on the black matrix 22 and the phosphor layers 20. The thin metal layer 24 helps improve the withstand voltage and brightness characteristics of the field emission display device.

The front substrate 4 and the back substrate 2 are combined with sealant while leaving a certain space therebetween, and the gate electrode 10 is arranged to be perpendicular to the phosphor layer 20. Then, the internal space between the substrates is evacuated to provide a vacuum therein, thereby providing a field emission display device.

The field emission display device is driven by supplying a certain voltage to the cathode electrode 6, the gate electrode 10, and the anode electrode 18 from the outside. For example, a (−) voltage of several to several tens of volts is supplied to the cathode electrode 6, a (+) voltage of several to several tens of volts is supplied to the gate electrode 10, and a (+) voltage of several hundreds to several thousands of volts is supplied to the anode electrode 18.

The field is generated around the electron emission source 14 by the voltage difference between the cathode electrode 6 and gate electrode 10 so that electrons are emitted. The emitted electrons are guided to the high voltage applied in the anode electrode 18 and collide with the phosphor layer 20 of a corresponding pixel to emit light so that a certain image is displayed.

The electron emission source 14 emits the electron by the carbon nano tubes 16 exposed on the surface, and at the same time, it links the cathode electrode 6 with each of the carbon nano tubes 16 since it has the aforementioned specific resistance.

Supposing that each carbon nano tube 16 exposed on the surface of the electron emission source 14 is an electron emission site, each electron emission site emits electrons only at certain electron sites when the resistive layer is not applied since the morphology of the electron emission sites is different for each (for example, vertical aligning degree and protruding heights of carbon nano tubes), so local field enforcement effects become different.

Nonetheless, since the electron emission source 14 of the present invention has a certain specific resistance, the voltage is decreased between the cathode electrode 6 and the electron emission site where a lot of current is emitted, so that the amount of emitted current is reduced. Meanwhile, on the electron emission site where a small amount of current is emitted, the voltage is not decreased or it is decreased to a lesser extent so that the voltage difference between the cathode electrode 6 and the gate electrode 10 is preserved to maintain the amount of emitted current.

Considering the above, according to the present invention, the difference between the amount of emitted current between two electron emission sites is relatively decreased, so that the uniformity of electron emission is improved compared to the conventional case. The loading current applied to each electron emission site is reduced so that it is anticipated to improve the life cycle characteristics of an electron emission source 14.

Figure 2:
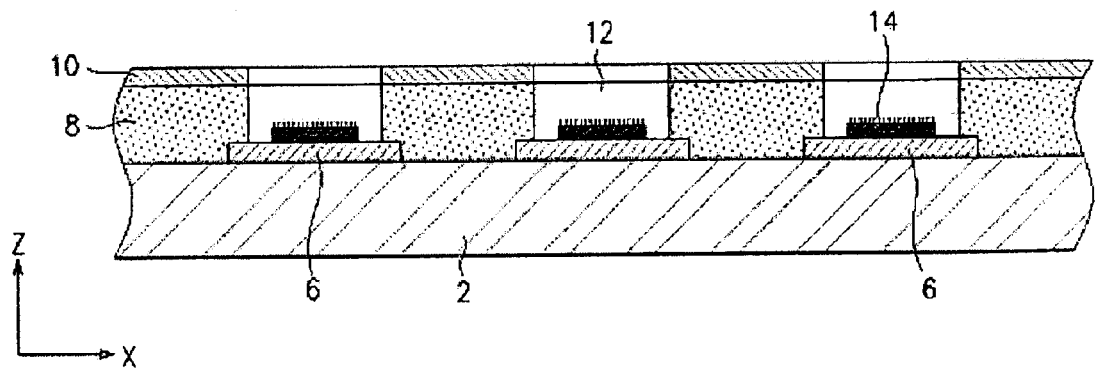
FIG. 2 is a schematic view showing a modified form of the field emission display device according to Example 1 of the present invention.

FIG. 2 is a schematic view showing a modified form of the field emission display device according to the first described embodiment of the present invention. As shown in FIG. 2, the cathode electrode 6 is formed on the back substrate 2 without an emitter receptor in a stripe pattern along one direction. The electron emission source 14 according to the present invention is formed on the surface of the cathode electrode 6.

Also, in this case, since the electron emission source 14 has a specific resistance of 1 to $10^7$ Ωcm, the aforementioned effects, such as functioning as a resistive layer for linking the cathode electrode 6 with each carbon nano tube 16, are realized.

Figure 3:
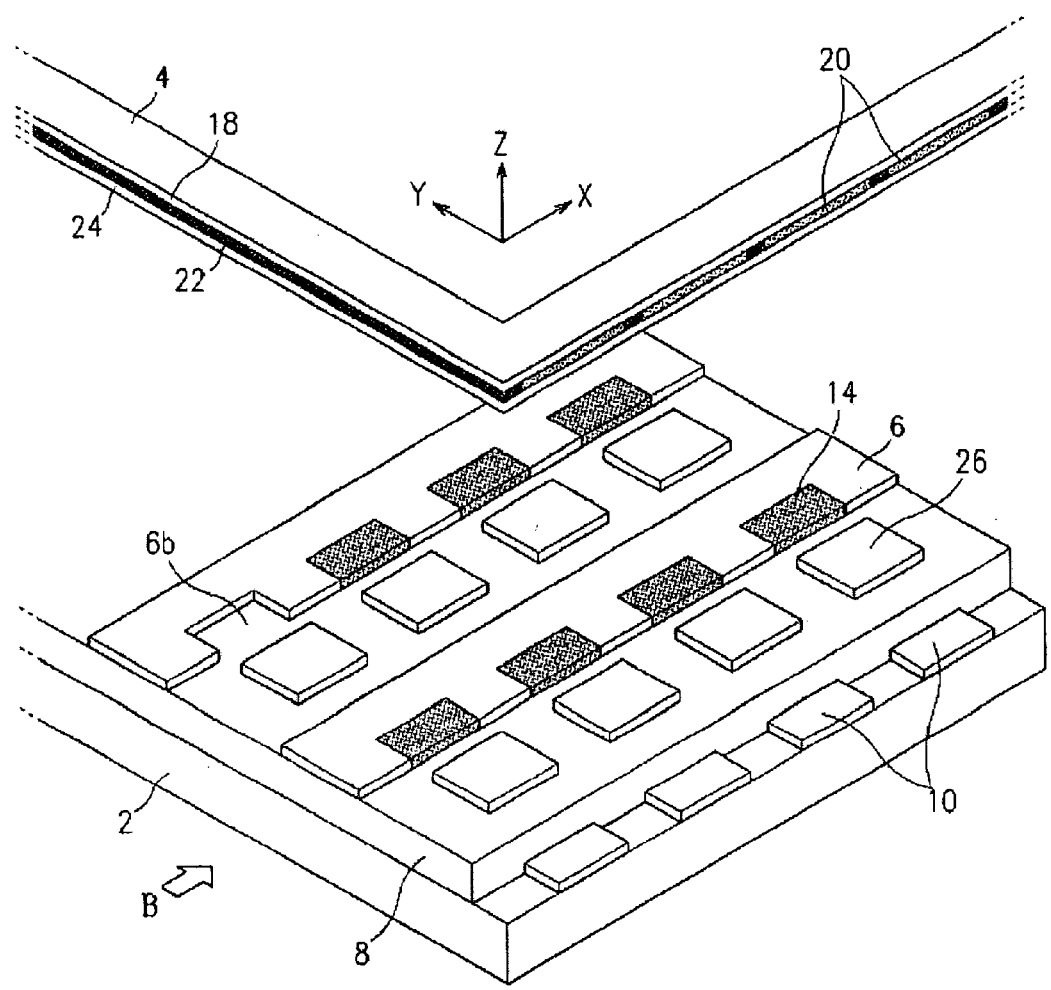
FIG. 3 is a partially exploded perspective view showing a field emission display device according to Example 2 of the present invention.

FIG. 3 is a partially exploded perspective view showing a field emission display device according to the second described embodiment of the present invention.

As shown in FIG. 3, the gate electrodes 10 are formed on the back substrate 2 in a stripe pattern along one direction (i.e., the Y-direction of the drawing). An insulating layer 8 is formed on the gate electrodes 10 over the whole surface of the back substrate 2. On the insulating layer 8, cathode electrodes 6 are formed in a stripe pattern in a direction perpendicular to the gate electrode 10.

A counter electrode 26 may be further formed between the cathode electrodes 6 while leaving a certain space to raise the field to a level over the insulating layer 8.

Figure 4:
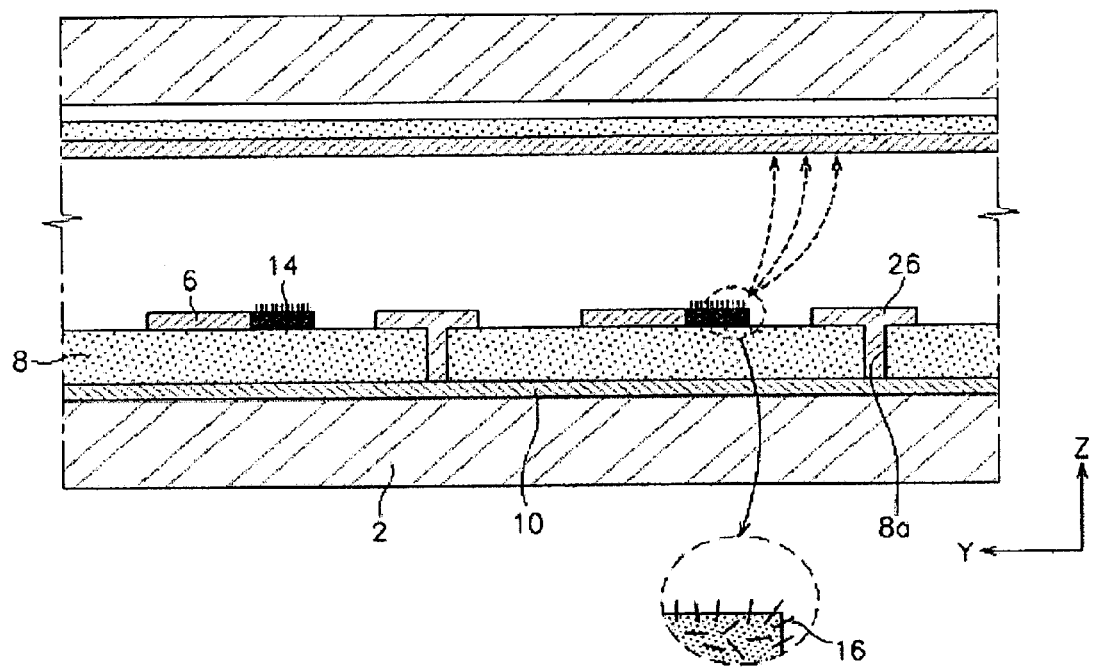
FIG. 4 is a partially combined cross-sectional view taken in the direction of the arrow B of FIG. 3.

The counter electrode 26 contacts and is electronically linked with the gate electrode 10 through a via hole 8a formed in the insulating layer 8, as shown in FIG. 4.

An emitter receptor hole 6b is formed by removing conductive material of the cathode electrode 6 on an edge of the cathode electrode 6 facing the counter electrode 26. An electron emission source 14 is accommodated in the emitter receptor.

The electron emission source 14 has the same structure as described above, and it contacts one side of the cathode electrode 6 and is linked with the cathode electrode 6 in a horizontal direction. The resistive conductive material of the electron emission source 14 acts as a resistive layer for linking the edge of the cathode electrode 6 with the carbon nano tubes 16.

When the driving voltage is applied to the gate electrode 10 and cathode electrode 6, the field of the gate electrode 10 is supplied around the electron emission source 14 through the counter electrode 26 so that electrons are emitted from the edge of the electron emission source 14, and particularly, from each of the carbon nano tubes 16 present at the edge of the electron emission source 14. During this process, the resistive conductive material of the electron emission source 14 can act as a resistive layer. A detailed description of the effect caused by the resistive layer is omitted since it is the same as described above.

Figure 5:
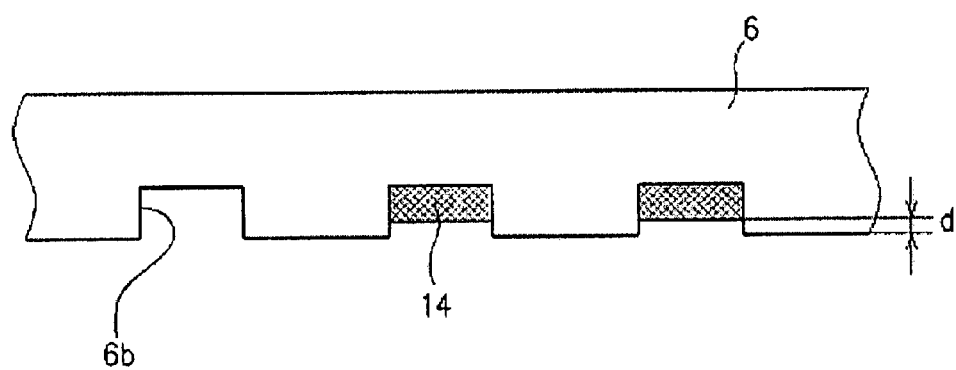
FIG. 5 is a schematic view showing a modified form of field emission display device according to Example 2 of the present invention.

As shown in FIG. 5, the electron emission source 14 positioned in the emitter receptor hole 6b is preferably formed in an area inside the edge of the cathode electrode 6 while leaving a certain distance (d) toward the inside of the emitter receptor hole 6b from the edge of the cathode electrode 6.

This is because when several to several tens of (−) volts are supplied to the cathode electrode 6 while driving the field emission display device, the electrons having a (−) electric charge emitted from the electron emission source 14 receive a focused force which is not scattered toward the front substrate 4 by receiving the repulsion force due to the (−) voltage applied to the cathode electrode 6.

In the field emission display device having the electron emission source according to the present invention, the difference of the amount between emitted currents between two electron emission sites is relatively reduced, so that the uniformity of electron emission is improved and a loading current applied to each electron emission site is reduced. Therefore, it is anticipated to improve the life cycle of the electron emission source 14.

Figure 17:
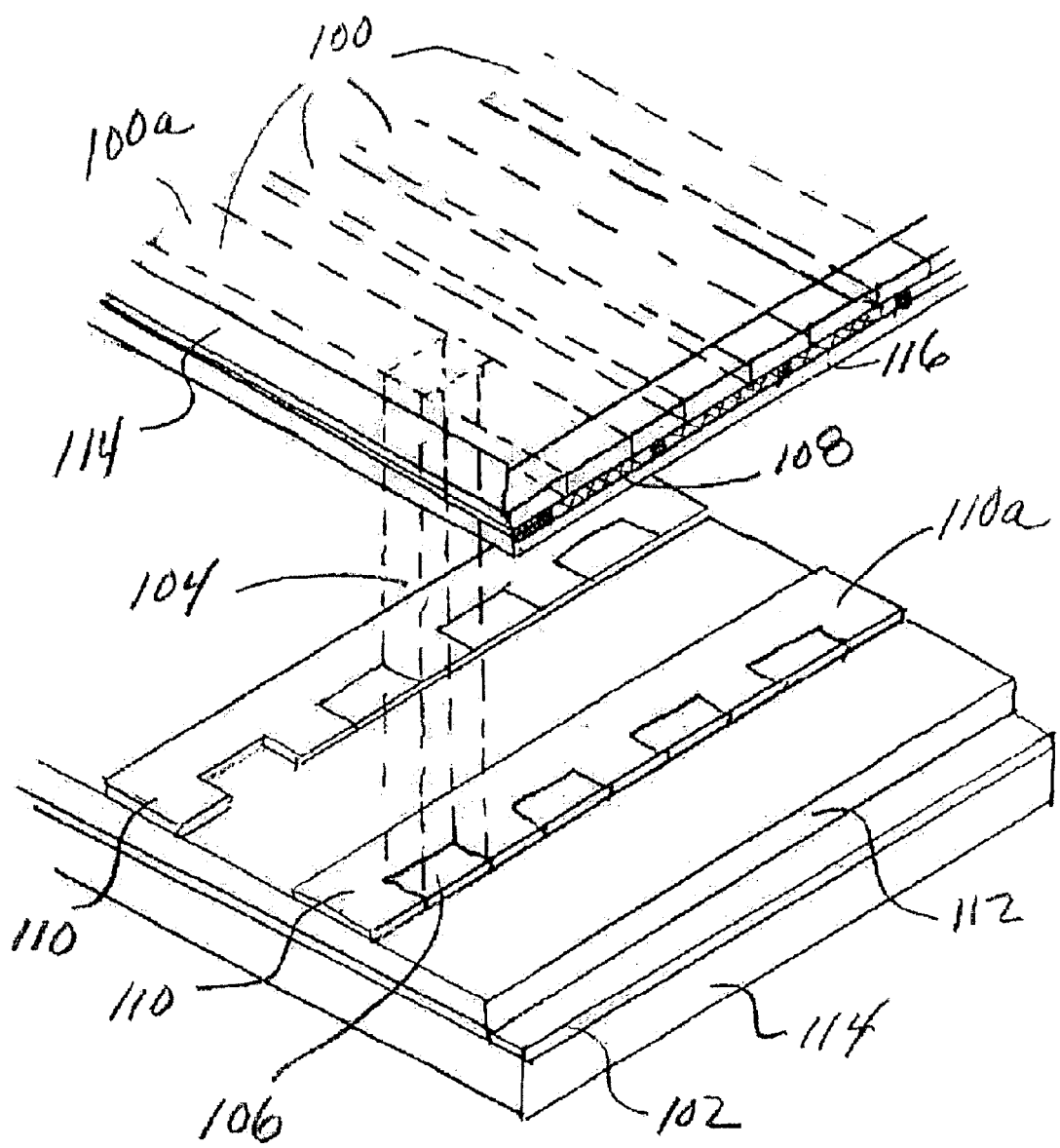
FIG. 17 is a partially exploded perspective view showing a field emission display device according an alternative embodiment of the present invention.

Those skilled in the art can appreciate that further embodiments of the present field emission display invention can be implemented. Referring to FIG. 17 for example, a plurality of anode electrodes 100 can be formed in a striped pattern while having one gate electrode 102 function as the common electrode. Gate electrode 102 would be separated from cathode electrodes 110 by insulating layer 112. Anode electrodes 100 would be formed on substrate 114. Optional metal layer 116 would be formed on phosphor layers 108. In this embodiment a pixel region would be formed between an emitter 106 and a respective phosphor layer 108 of a predetermined phosphor layer pattern at each intersecton of a cathode electrode 110 and an anode electrode 100, for example cathode 110a and anode electrode 100a when the anode electrode is such a common gate electrode. Those skilled in the art would then appreciate that the cathode electrode would receive scanning information while the anode electrode would receive data information and vice versa.

The following examples illustrate the present invention in further detail. However, it is understood that the present invention is not limited by these examples.

EXAMPLE 1

8 wt % of carbon nano tubes was mixed with 2 wt. % of 800 L glass frit. ⅓ of the obtained mixture was introduced into a ball mill pot filled with balls and rotated at a rate of 5 to 100 rpm. It was then filtered with a 50 mesh sieve.

25 wt. % of Elvasite acryl resin in 60% terpineol solvent was mixed with 25 wt. % of ethyl cellulose solid phase in 60% terpineol solvent. The obtained mixture was further mixed with 25 wt. % of a cresol epoxy acrylate oligomer in 50% butyl carbitol acetate (BCA), and 1.5 wt % of a dispersant of BYK-164 was added thereto.

10 wt. % of the mixture of the carbon nano tubes and the glass frit was mixed with 75 wt. % of the mixture of acryl, ethyl cellulose, and cresol epoxy acrylate oligomer and agitated. 7 wt. % of a photoinitiator (HSP-188, manufactured by SK-UCB) and 1 wt. % of an antifoamer (manufactured by Tegp) were added thereto and agitated for 5 hours. Then, a pentaerytritol-tri-tetra-acrylate photoinitiator was added at 5.5 wt. % and mixed.

The mixture was rotated more than 10 times with a 3-roll-mill to uniformly disperse the powder in the resin. Then, a terpineol organic solvent was added at 12 wt. % to prepare a paste-phase electron emission source composition of carbon nano tubes. The composition had a viscosity of 25,000 cP.

EXAMPLE 2

The electron emission source composition was prepared by the same method as in Example 1, except that a mixture of 50 wt. % of cresol epoxy acrylate oligomer and 50 wt. % of ethyl cellulose solid phase was employed instead of acryl resin.

COMPARATIVE EXAMPLE 1

The electron emission source composition was prepared by the same method as in Example 1, except that only 50 wt.

% of polyester acrylate was employed instead of the mixture of acryl resin and ethyl cellulose solid phase.

COMPARATIVE EXAMPLE 2

The electron emission source composition was prepared by the same method as in Example 1, except that only 50 wt. % of ethyl cellulose solid phase was employed instead of the mixture of acryl resin and ethyl cellulose solid phase.

EXAMPLE 3

The composition according to Example 1 was printed on the cathode electrode and dried in a drier at a temperature of 90° C. for 1 hour. Then, it was exposed with a pattern mask at an exposure energy of 2,000 mJ/cm$^2$ and developed with a 0.4% sodium carbonate ($Na_2CO_3$) aqueous solution. The residual was removed using an ultrasonic cleaner to provide a thick layer. The thick layer was baked under an air and nitrogen atmosphere at 450° C. for 10 minutes to provide an electron emission source having triode carbon nano tubes.

EXAMPLE 4

An electron emission source having triode carbon nano tubes was prepared by the same method as in Example 3, except that the composition of Example 2 was employed instead of the composition of Example 1.

COMPARATIVE EXAMPLES 3 AND 4

Electron emission sources having triode carbon nano tubes according to Comparative Examples 3 and 4 were prepared by the same method as in Example 3, except that the compositions of Comparative Example 1 and 2 were employed, respectively.

Figure 6:
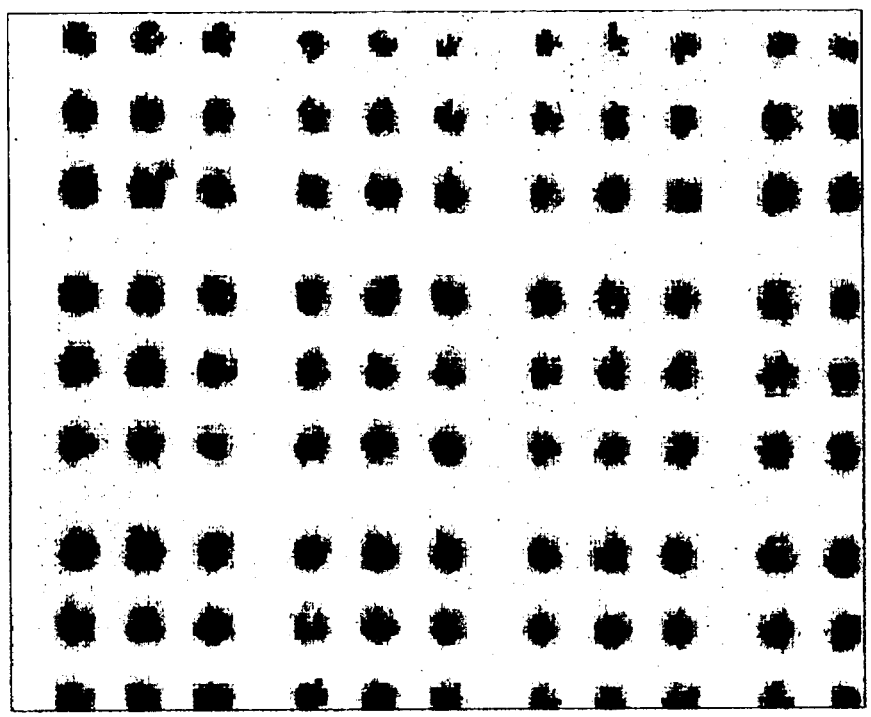
FIG. 6 is a photograph showing a carbon nano tube electron emission source according to Example 3 of the present invention.
Figure 7:
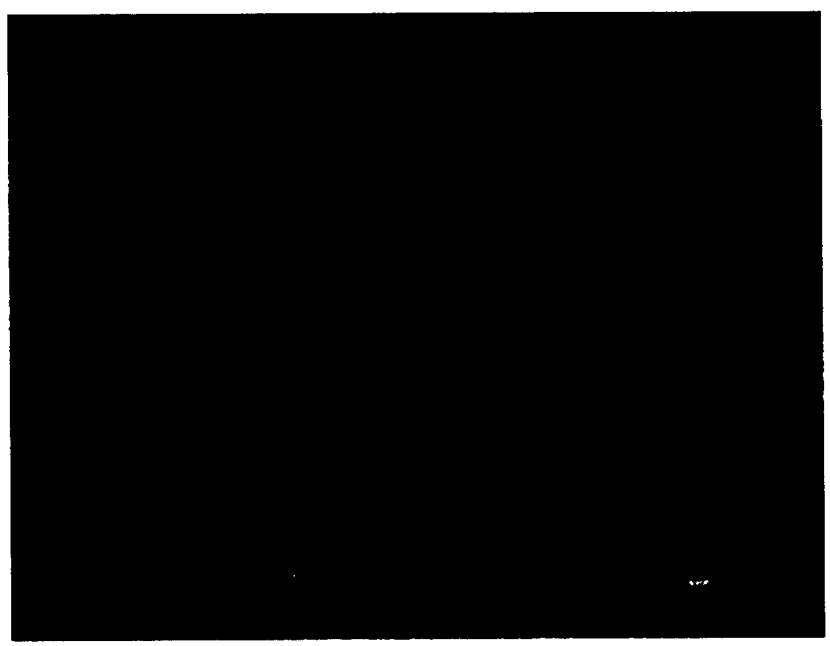
FIG. 7 is a photograph showing the application of a field to the carbon nano tube electron emission source according to Example 3 of the present invention.
Figure 8:
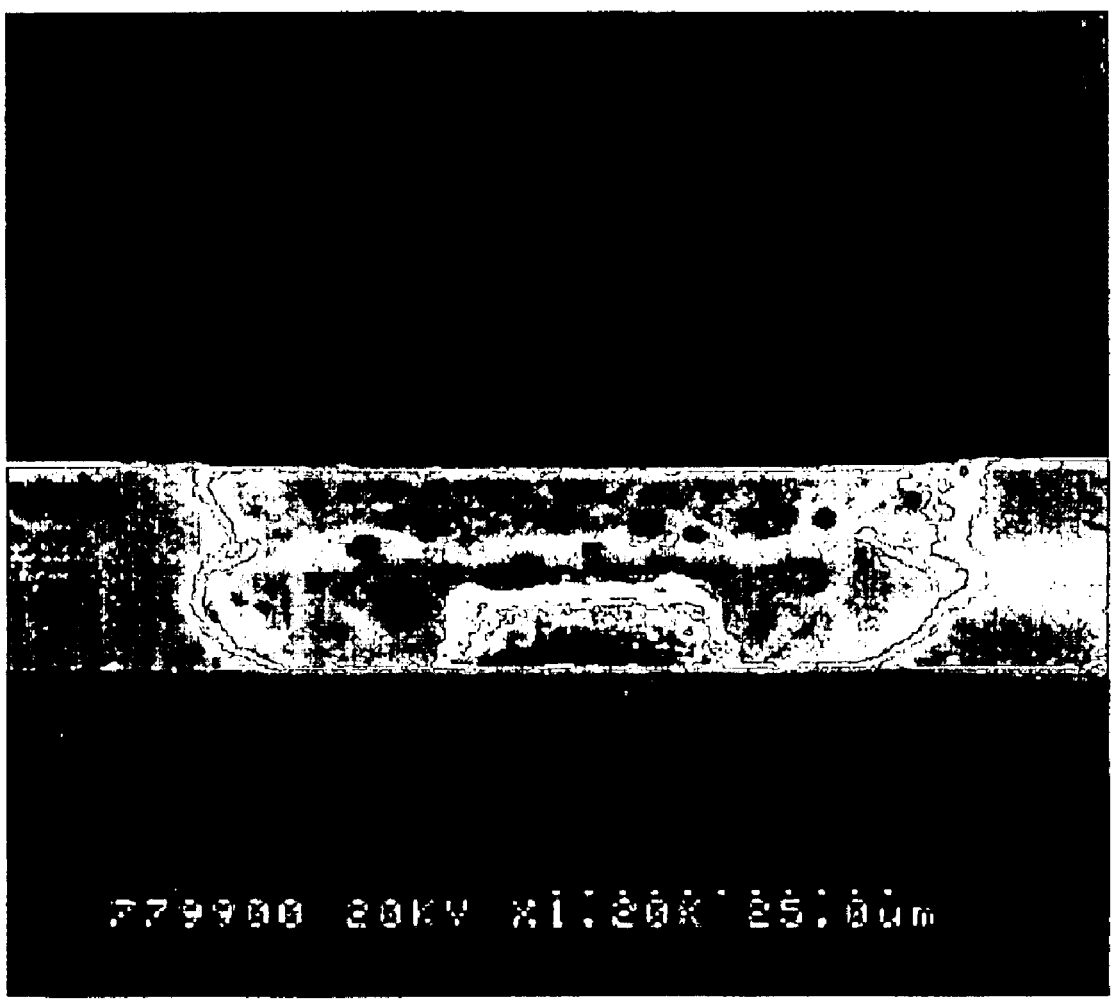
FIG. 8 is a cross-sectional photograph showing a carbon nano tube electron emission source according to Example 3 of the present invention.

FIG. 6 is a photograph of a field emission display device according to Example 3, and FIG. 7 is a photograph of the case where a triode is front driven by supplying a field to the field emission display device of Example 3 where the anode voltage is 600V and the gate voltage is 60V. FIG. 8 is a cross-sectional view of an electron emission source having carbon nano tubes according to Example 3. As shown FIGS. 6 to 8, it is found that micro holes having a particle size of 20 µm or less are selectively patterned.

Figure 9:
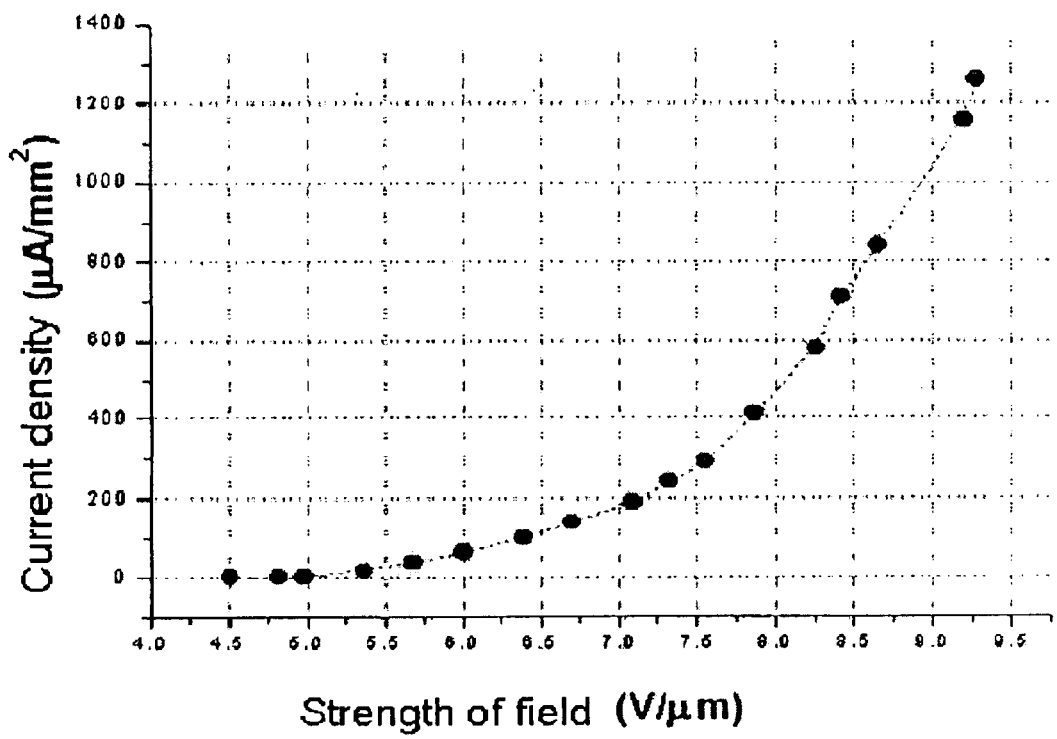
FIG. 9 is a graph showing the current density of electrons emitted from the carbon nano tube electron emission source according to Example 3 of the present invention versus field strength.
Figure 10:
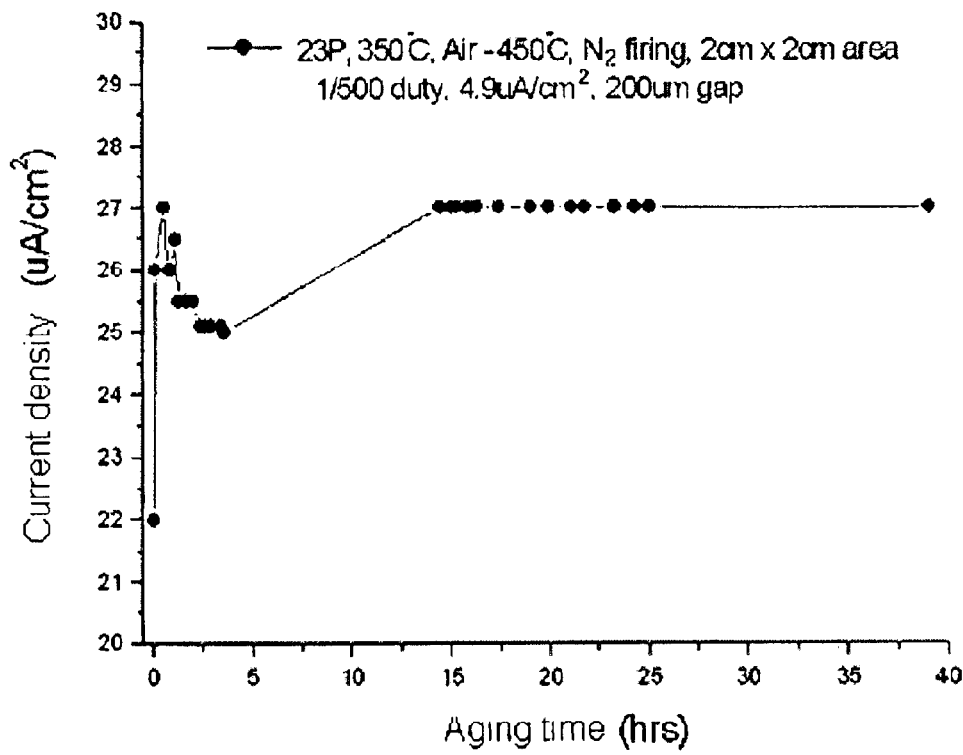
FIG. 10 is a graph showing the current density of electrons emitted from the carbon nano tube electron emission source according to Example 3 of the present invention versus aging time.

Further, as shown in FIG. 7, it is confirmed that the uniformity of emitted light and the emission characteristics of an emission display device according to the present invention are improved. In addition, as shown in FIG. 8, it is found that the electron emission source having the carbon nano tubes can be formed in a triode structure without causing a short between the gate and the cathode. FIG. 9 is a graph showing the current density versus the strength of field of the electron emission source having the carbon nano tubes according to Example 3 of the present invention, and FIG. 10 is a graph showing the current density versus aging time. As shown in FIG. 9, the current density reaches 300 µA/µm when the emission voltage is 7.5 V/µm. Accordingly, it is confirmed that the present invention can achieve more than the reference of 10 µA/µm. Further, as shown in FIG. 10, it is found that the current density does not decrease over time.

Figure 11A:
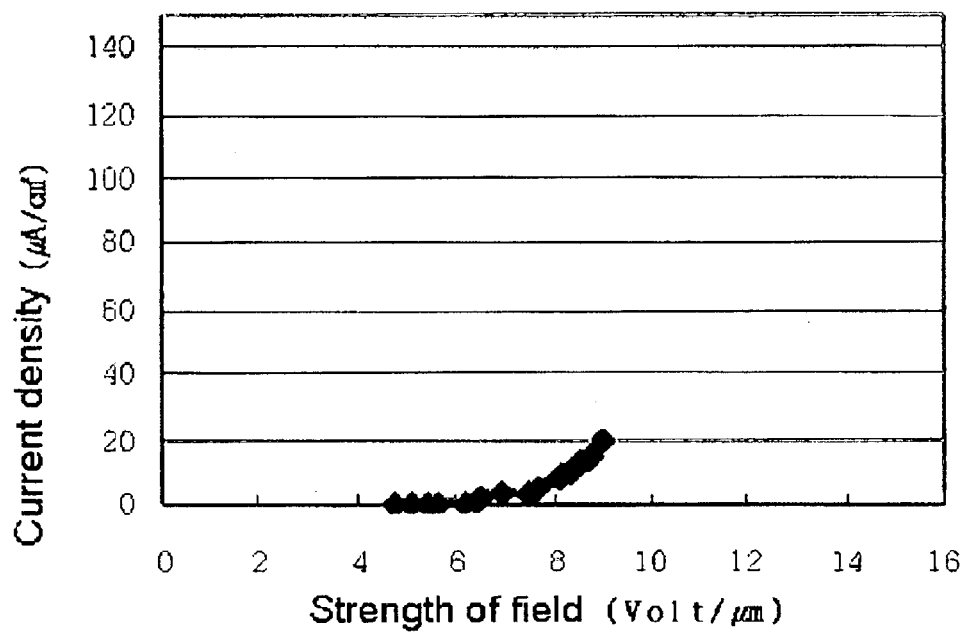
FIG. 11a is a graph showing the current density of electrons emitted from the carbon nano tube electron emission source according to Comparative Example 3 versus field strength.
Figure 11B:
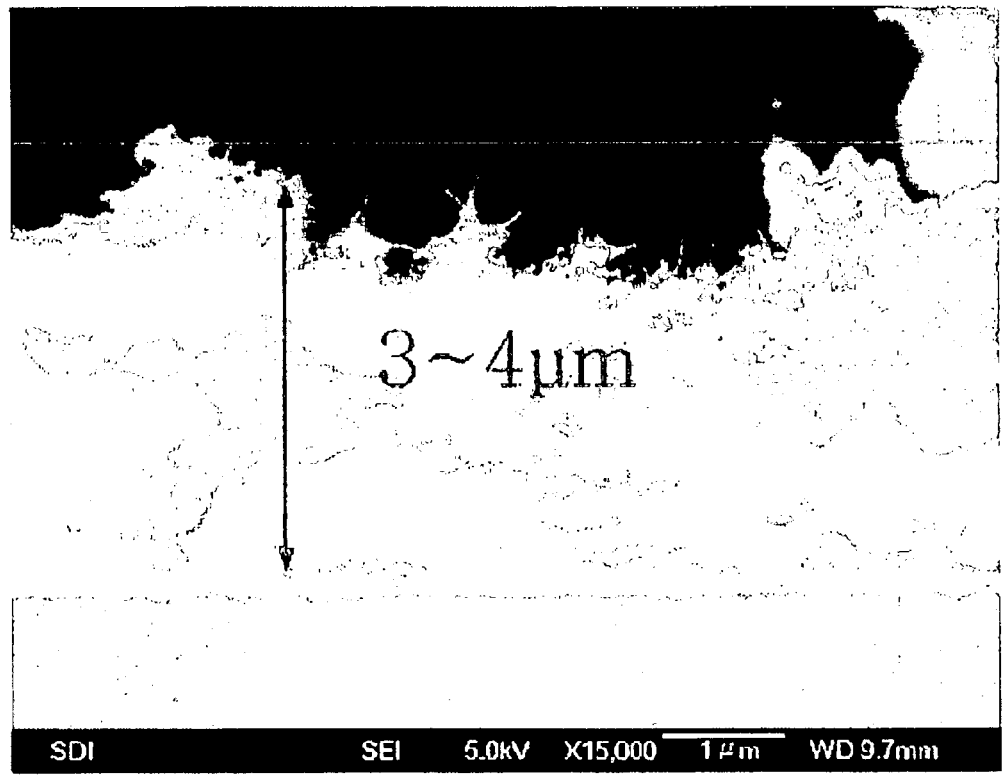
FIG. 11b is a Scanning Electron Microscope (SEM) photograph of a composition layer taken after patterning during fabrication of a carbon nano tube electron emission source using the electron emission source composition according to Comparative Example 1.

FIG. 11a is a graph showing the current density of electrons versus the strength of field of the carbon nano tube electron emission source according to Comparative Example 3, and FIG. 11b is a Scanning Electron Microscope (SEM) photograph of a composition layer taken after patterning during fabrication of a carbon nano tube electron emission source using the carbon nano tube electron emission source composition according to Comparative Example 1.

Figure 12:
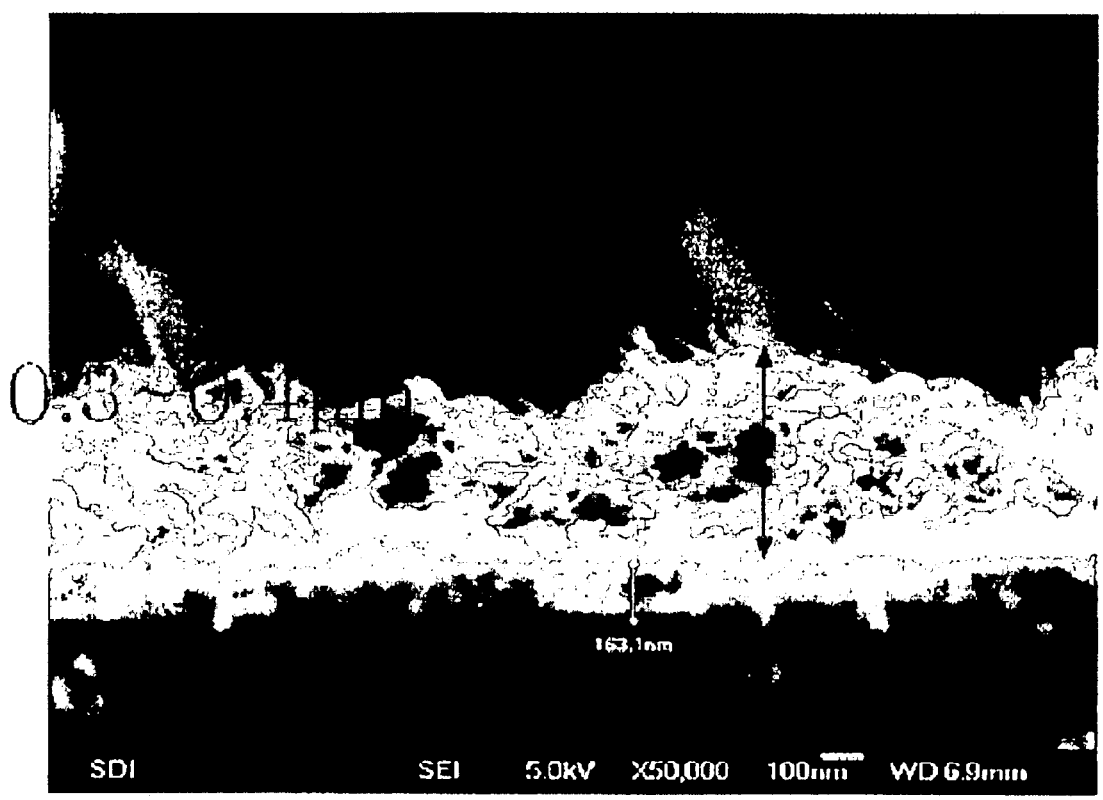
FIG. 12 is a Scanning Electron Microscope photograph (SEM) of a composition layer taken after patterning during fabrication of a carbon nano tube electron emission source using the electron emission source composition according to Comparative Example 2.

FIG. 12 is a Scanning Electron Microscope (SEM) photograph of a composition layer taken after patterning during fabrication of a carbon nano tube electron emission source using the carbon nano tube electron emission source composition according to Comparative Example 2.

As shown in FIG. 11a, the carbon nano tube electron emission source according to Comparative Example 3 has a current density lower than those of Examples 3 and 4 of the present invention. Further, as shown in FIGS. 11b and 12, the thicknesses of composition layers for forming the electron emission source taken after patterning according to Comparative Examples 1 and 2 are respectively 3 to 4 µm, so that the distance to the gate electrode becomes farther when it is applied to the triode structure.

Figure 13:
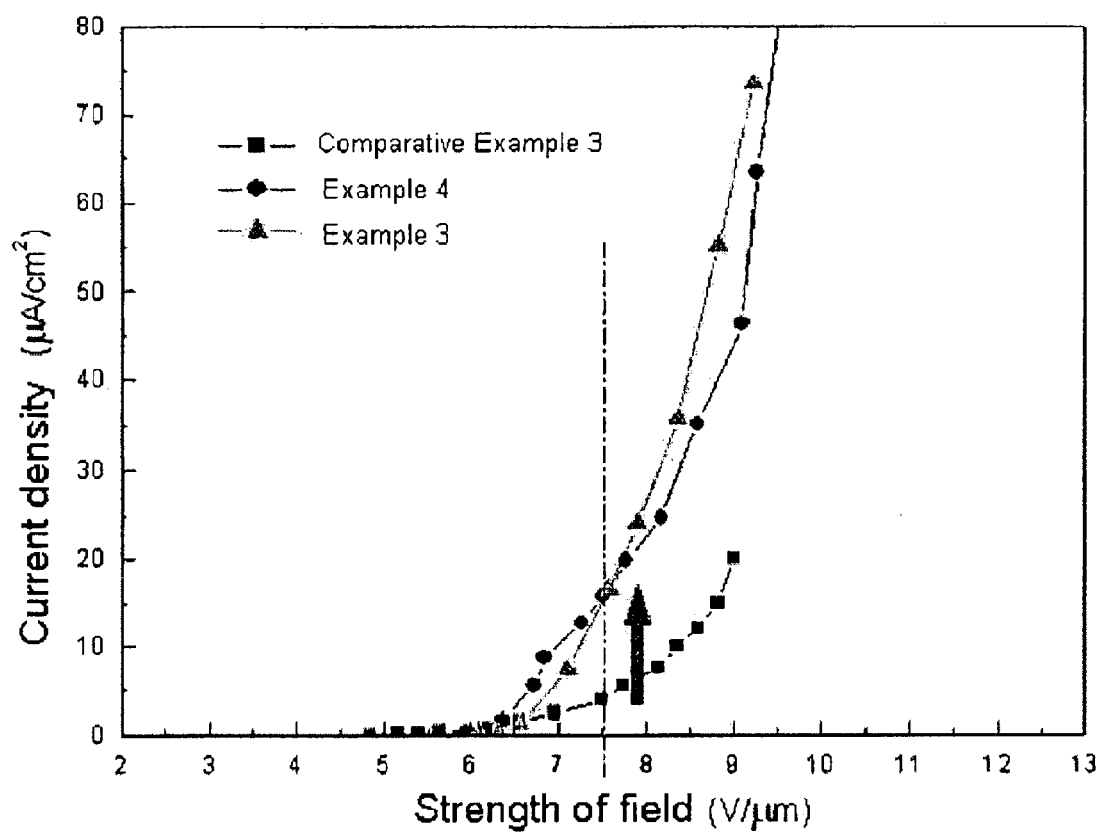
FIG. 13 is a graph showing current density of electrons emitted from the carbon nano tube electron emission sources according to Examples 3 and 4, and Comparative Example 3.

FIG. 13 is a graph showing the current density of electrons emitted from the carbon nano tube electron emission source according to Examples 3 and 4 and Comparative Example 3. The current density obtained from the cases when the mixed resin according to Examples 1 and 2 are employed is improved compared to that when only acrylate resin according to Comparative Example 3 is employed.

Figure 14:
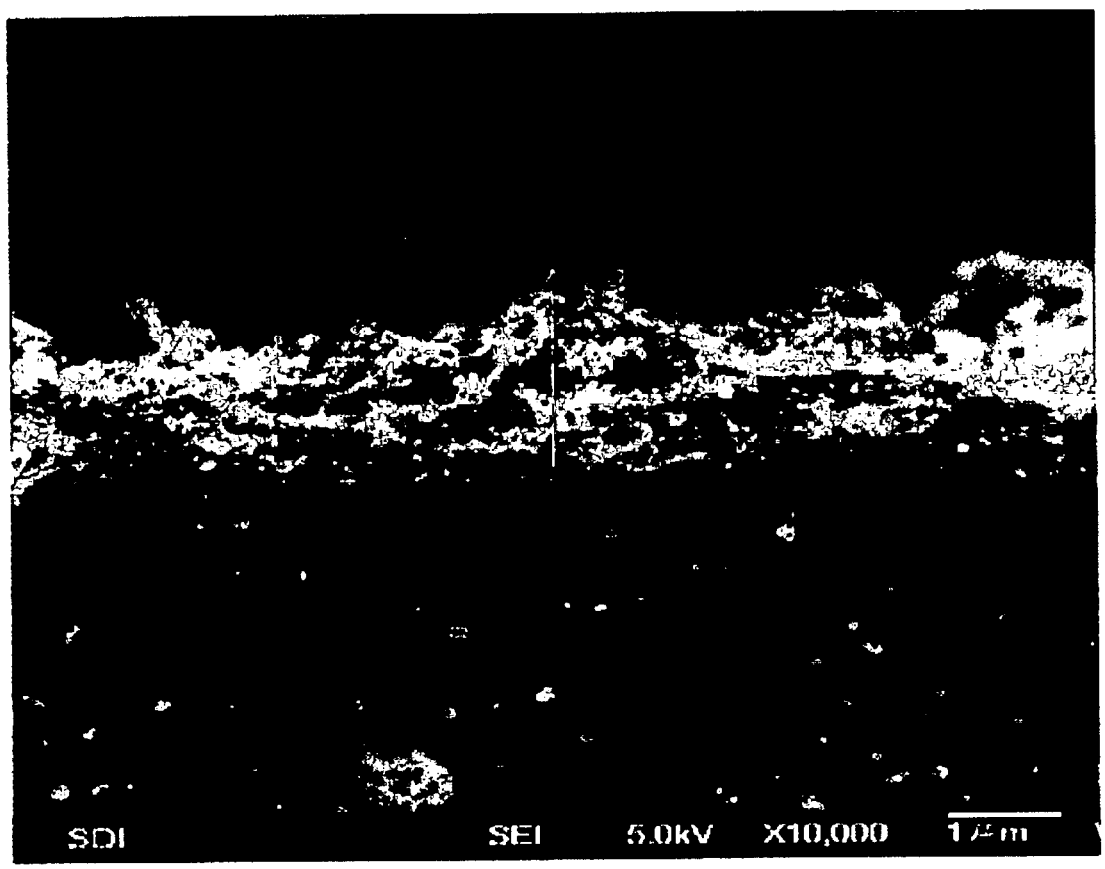
FIG. 14 is a Scanning Electron Microscope (SEM) photograph of a composition layer taken after patterning during fabrication of a carbon nano tube electron emission source using the electron emission source composition according to Example 1.
Figure 15:
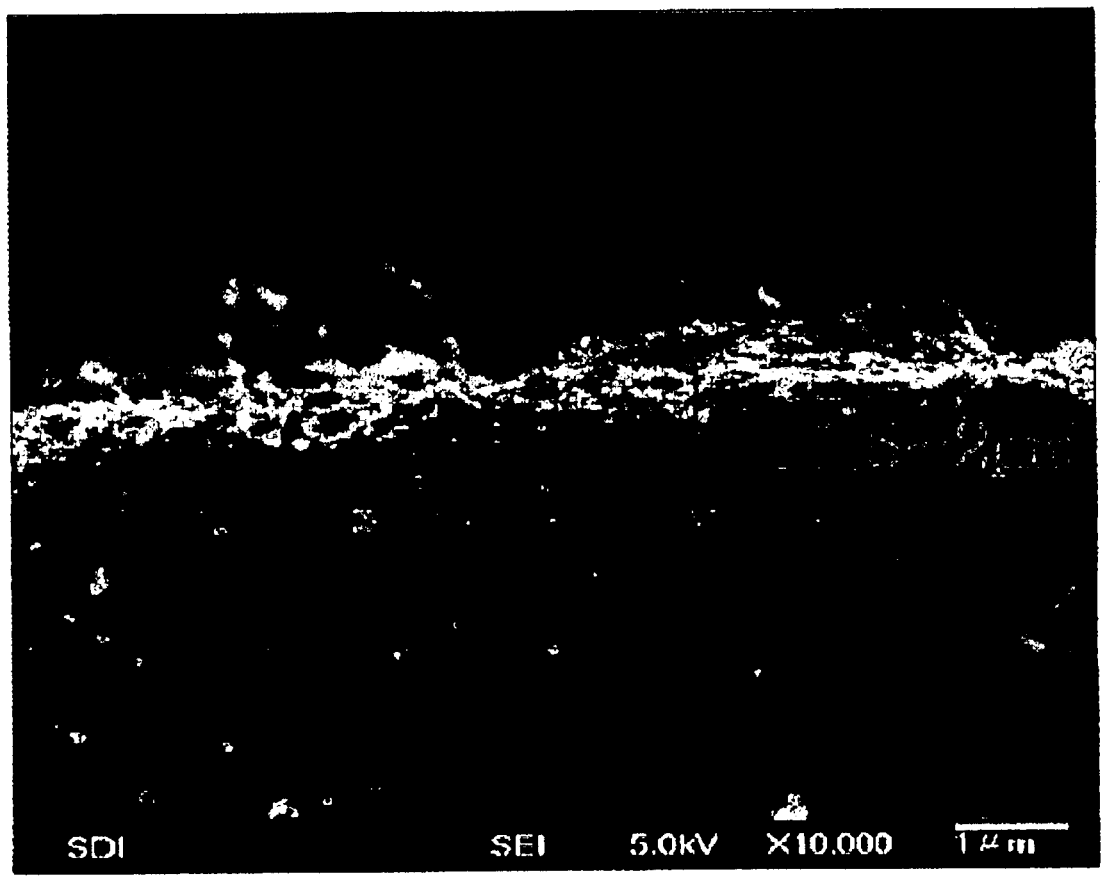
FIG. 15 is a Scanning Electron Microscope (SEM) photograph of a composition layer taken after patterning during fabrication of a carbon nano tube electron emission source using the electron emission source composition according to Example 2.

FIGS. 14 and 15 are Scanning Electron Microscope (SEM) photographs of composition layers taken after patterning during fabrication of a carbon nano tube electron emission source using the carbon nano tube electron emission source composition according to Examples 1 and 2, respectively. As shown in FIGS. 14 and 15, it is found that the compositions according to Examples 1 and 2 are suitable for applying the triode structure.

EXAMPLE 5

The electron emission source composition was prepared by the same method as in Example 1, except that the carbon nano tubes were employed in an amount of 4 wt. %.

EXAMPLE 6

The electron emission source composition was prepared by the same method as in Example 1, except that the carbon nano tubes were employed in an amount of 12 wt. %.

COMPARATIVE EXAMPLE 4

The electron emission source composition was prepared by the same method as in Example 1, except that carbon nano tubes were not employed.

Figure 16:
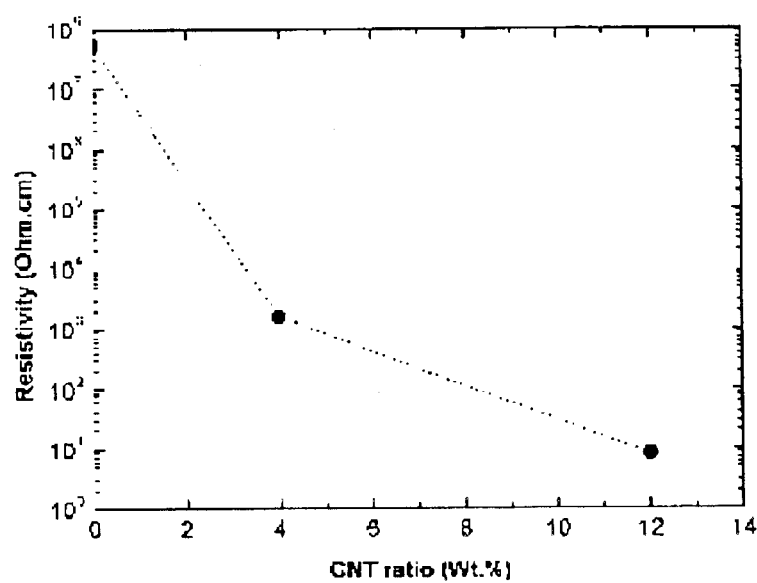
FIG. 16 is a graph showing a specific resistance with respect to the amount of carbon nano tubes in Examples 5 and 6, and Comparative Example 3.

Electron emission sources were fabricated using electron emission source compositions according to Examples 5 and 6 and Comparative Example 4, then the specific resistances were measured and the results are shown in FIG. 16. As shown FIG. 16, the specific resistance levels of Examples 5 and 6 were $10^3$ and 10 Ωcm, respectively, while that of Comparative Example 4 was $10^8$ Ωcm. Accordingly, it was found that the specific resistance of the electron emission source having 1 to 20 wt. % of carbon nano tubes was 1 to $10^7$ Ωcm, so that it can also function as a resistive layer.

Accordingly, the present invention can effectively provide a carbon nano tube electron emission source structure required to be micro-patterned or a triode structure required to control the morphology of an electron emission source. Further, it is found that it can improve the emission current and the current density characteristics.

According to the present invention, the electron emission source composition and the method of fabricating the same improve exposure processability and develop processability. It is also possible to micro-pattern a cathode electrode by minimizing the vacuum level decline and the current density decline, and the emission current characteristics of an electron emission source having carbon nano tubes is improved.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A field emission display device comprising:
   a first substrate and a second substrate opposite the first substrate with a certain space therebetween to construct a vacuum container;
   an electron emission source positioned on the first substrate;
   means for emitting electrons from the electron emission source; and
   means for emitting light, positioned on the second substrate to express an image by means of the electrons emitted from the electron emission source,
   wherein the electron emission source comprises 1 to 30 wt % of carbon nano tubes and has a specific resistance of 1 to $10^7$ Ωcm.

2. The filed emission display device according to claim 1, wherein the emission source comprises 20 to 30 wt % of carbon nano tubes.

3. The field emission display device according to claim 1, wherein the electron emission source comprises glass frit in an amount of 1 to 500 parts by weight per 100 parts by weight of the carbon nano tubes, and the electron emission source further comprises an organic binder resin comprising ethyl cellulose and at least one of acrylate resin and acryl resin.

4. The field emission display device according to claim 3, wherein the organic binder comprises ethyl cellulose, acrylate resin and acryl resin.

5. The field emission display device according to claim 1, wherein the means for emitting electrons comprises:
   cathode electrodes formed in a predetermined pattern on the first substrate, and having a receptor for the electron emission source in which the conductive material is removed so that the electron emission source is accommodated in the receptor for the electron emission source;
   an insulating layer formed on a surface of the first substrate to cover a portion of the cathode electrodes so that the electron emission source is exposed; and
   gate electrodes formed on the insulating layer in a predetermined pattern perpendicular to each of the cathode electrodes so that the electron emission source is exposed.

6. The field emission display device according to claim 1, wherein the means for emitting electrons comprises:
   cathode electrodes formed in a predetermined pattern on the first substrate, the electron emission source being on the surface of the cathode electrodes;
   an insulating layer formed on a surface of the first substrate to cover a portion of the cathode electrodes so that the electron emission source is exposed; and
   gate electrodes formed on the insulating layer in a predetermined pattern perpendicular to each of the cathode electrodes so that the electron emission source is exposed.

7. The field emission display device according to claim 1, wherein the means for emitting electrons comprises:
   gate electrodes formed in a stripe pattern on the first substrate;
   an insulating layer formed on a whole surface of the first substrate to cover the gate electrodes; and
   cathode electrodes formed on the insulating layer in a stripe pattern perpendicular to each of the gate electrodes, and having a receptor for the electron emission source on which the conductive material is removed on its edge so that the electron emission source is accommodated in the receptor for the electron emission source.

8. The field emission display device according to claim 1, wherein the electron emission source further comprises a counter electrode disposed between the cathode electrodes with a certain space therebetween.

9. The field emission display device according to claim 7, wherein the counter electrode contacts the gate electrode through a via hole formed in the insulating layer to electrically link it to the gate electrode.

10. The field emission display device according to claim 1, wherein the edge of the electron emission source is formed in an area inside the edge of the cathode electrode.

11. A field emission display, comprising:
   a first substrate;
   at least one gate electrode formed in a predetermined gate electrode pattern on the first substrate;
   an insulation layer formed on the first substrate covering the at least one gate electrode;
   a plurality of cathode electrodes formed in a predetermined cathode electrode pattern on the insulation layer;
   emitters electrically contacting the cathode electrodes, wherein each emitter comprises carbon nano tubes and an organic binder resin comprising ethyl cellulose and at least one of acrylate resin and acryl resin;
   a second substrate opposing the first substrate with a predetermined gap therebetween, the first substrate and the second substrate forming a vacuum container;
   at least one anode electrode formed in a predetermined anode electrode pattern on a surface of the second substrate opposing the first substrate; and
   phosphor layers formed in a predetermined phosphor layer pattern on the anode electrode;
   wherein portions of the cathode electrodes are removed to form emitter-receiving sections, and fences are formed between the emitter-receiving sections, one of the emitters being provided in each of the emitter-receiving sections electrically contacting the cathode electrodes;
   wherein a pixel region is formed between an emitter and a respective phosphor layer of the predetermined phosphor layer pattern at each intersection of:
      a cathode electrode and a gate electrode when the anode electrode is a common anode electrode, or
      a cathode electrode and an anode electrode when the gate electrode is a common gate electrode; and
   wherein predetermined voltages are applied to the at least one anode electrode, cathode electrodes and the at least one gate electrode generating an electric field between respective gate electrodes and the emitters such that electrons emitted from emitters are induced toward and strike the phosphor layer in a corresponding pixel region to realize predetermined images.

12. The field emission display device according to claim 11, wherein the organic binder comprises ethyl cellulose, acrylate resin and acryl resin.

13. The field emission display of claim 11, wherein the at least one gate electrode formed in a predetermined gate electrode pattern is a plurality of gate electrodes formed in a striped pattern and the at least one anode electrode formed in a predetermined anode electrode pattern is one anode electrode functioning as the common electrode.

14. The field emission display of claim 11, wherein the at least one anode electrode formed in a predetermined anode electrode pattern is a plurality of anode electrodes formed in a striped pattern and the at least one gate electrode formed in a predetermined gate electrode pattern is one gate electrode functioning as the common electrode.

15. An electron emission source composition comprising:

1 to 20% by weight of carbon nano tubes;

glass frit;

an organic binder resin comprising ethyl cellulose and at least one of acrylate resin and acryl resin; and an organic solvent, wherein the glass frit is present in an amount of 1 to 500 parts by weight per 100 parts by weight of the carbon nano tubes.

16. The electron emission source composition according to claim 1, wherein the organic binder contains acrylate resin, acryl resin and ethyl cellulose resin in a weight ratio of 1:1:1 to 0.5:1:1.

17. The electron emission source composition according to claim 1, wherein the organic binder contains acrylate resin and cellulose resin in a weight ratio of 1:1 to 1:2.

18. The electron emission source composition according to claim 1, wherein the organic binder contains acryl resin and cellulose resin in a weight ratio of 1:1 to 1:2.

19. The electron emission source composition according to claim 1, containing and acrylate resin selected from the group consisting of epoxy acrylate and polyester acrylate.

20. The electron emission source composition according to claim 1, containing an acryl resin selected from the group consisting of epoxy acrylate, polyester acrylate, and acryl copolymer.

21. The electron emission source composition according to claim 1, wherein the organic solvent is selected from the group consisting of terpineol, butyl carbitol acetate, and texanol.

22. The electron emission source composition according to claim 1, wherein the specific resistance is 1 to $10^7$ Ωcm.

* * * * *